June 20, 1939.  C. E. SUMMERS  2,162,830

COMPOSITE PISTON

Filed Dec. 3, 1934  2 Sheets-Sheet 1

Inventor
Caleb E. Summers
By Blackmore, Spencer & Hirst
Attorneys

June 20, 1939.  C. E. SUMMERS  2,162,830
COMPOSITE PISTON
Filed Dec. 3, 1934   2 Sheets-Sheet 2

Inventor
Caleb E. Summers
By Blackmore, Spencer & Hind
Attorneys

Patented June 20, 1939

2,162,830

UNITED STATES PATENT OFFICE 2,162,830

COMPOSITE PISTON

Caleb E. Summers, Pontiac, Mich., assignor to General Motors Corporation, Detroit, Mich., a corporation of Delaware Application December 3, 1934, Serial No. 755,651

4 Claims. (Cl. 309—14)

This invention has to do with pistons used in internal combustion engines, and particularly with improvements on the piston disclosed and claimed in my prior Patent No. 1,770,818, granted July 15, 1930.

The piston herein disclosed is of the "composite" type, that is, it consists of a cast head, of aluminum or other light metal, and a skirt of pressed metal such as steel. Sheet metal soft enough to be readily formable is known to be very poor as a bearing metal against the cast iron of the cylinders so it is preferable to provide the skirt with a coating of soft bearing metal as disclosed in my prior patent, Reissue No. 18,814, granted May 2, 1933.

Since the metal of the piston head has a higher coefficient of expansion than that of the skirt the design of the piston should be such as to permit the necessary expansion of the head without distortion of the skirt. This is accomplished according to the present invention by providing longitudinal slots in the lower portion of the head over which the skirt is telescoped. It is, of course, not feasible to provide slots in the portions of the head adjacent the piston pin bearing bosses so it is necessary to relieve the corresponding portions of the skirt, as by grinding, to permit the required expansion.

Another improvement has to do with the means of attachment of the head and skirt. This is accomplished by providing inwardly pressed grooves in the skirt, preferably running longitudinally and located outside of the effective bearing area of the skirt. Plates secured to the head preferably by casting, bear against portions of the grooves and are secured thereto by welding or otherwise. By locating the connection between head and skirt outside of the piston bearing surface the latter is free from distortion or marring which would ordinarily result from the welding operation and at the same time the construction is such that the parts may be readily secured together in production.

In the drawings:
Figure 1 is a longitudinal vertical section through the piston.

Figure 4:
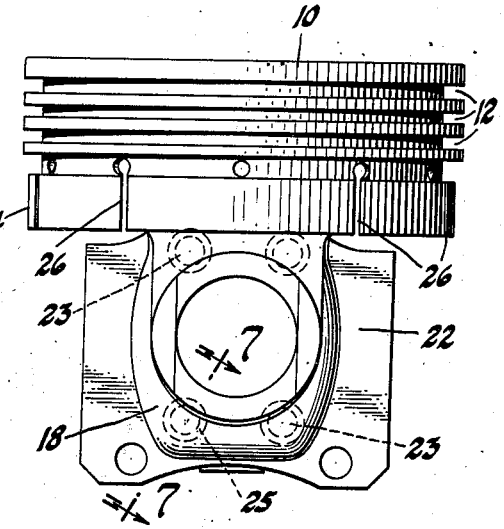

Figure 4 is a side elevation of the piston head assembly.

Figure 5:
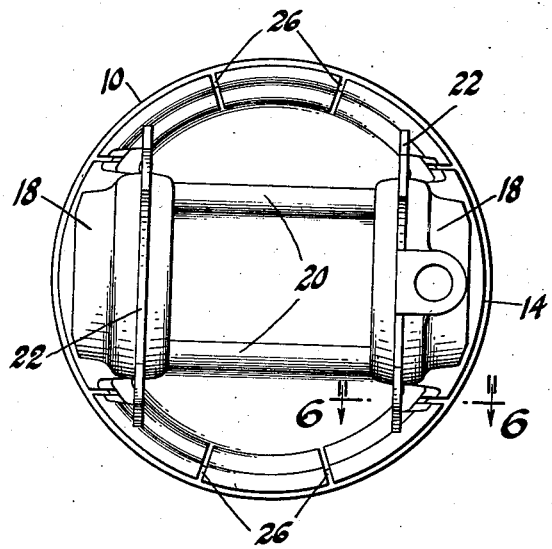

Figure 5 is a bottom plan view of the head assembly.

Figure 6:
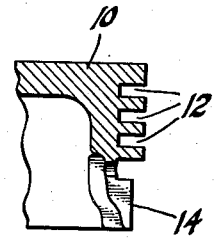
Figure 7:
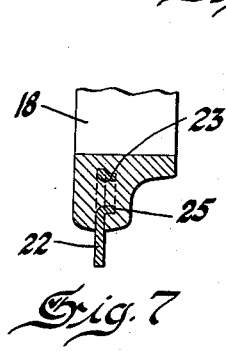

Figure 6 is a section on line 6—6 of Figure 5.
Figure 7 is a section on line 7—7 of Figure 4.

Figure 8:
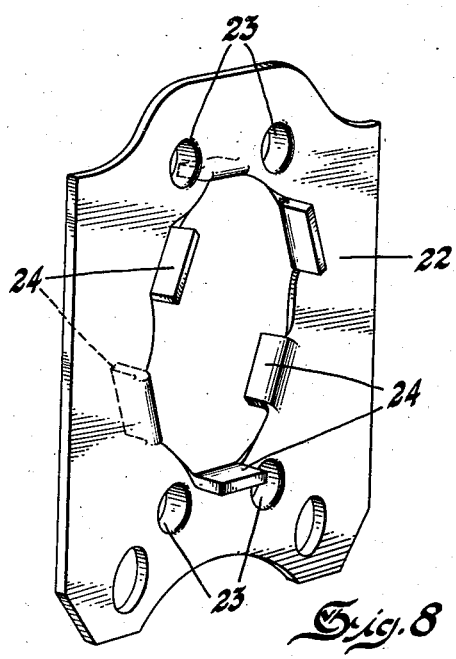

Figure 8 is a perspective view of the piston head attaching plate.

Figure 2:
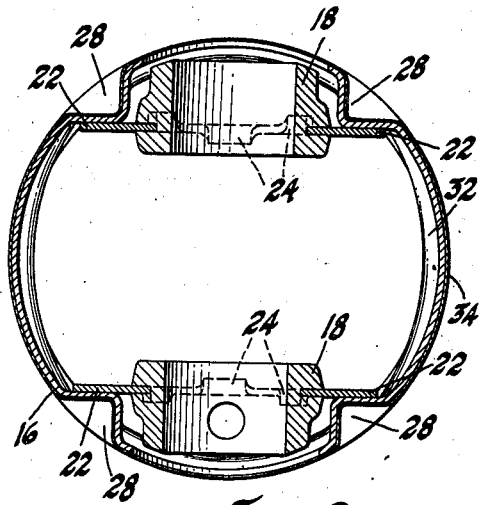
Figure 2 is a section on line 2—2 of Figure 1.
Figure 3:
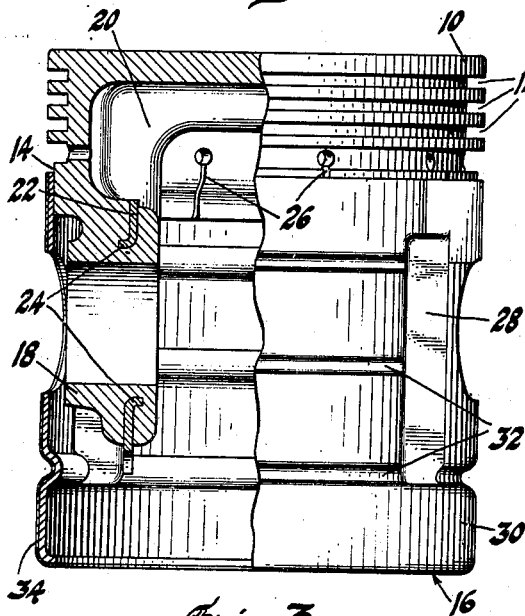
Figure 3 is a side elevation of the piston with parts in section.

10 indicates the cast head of the piston provided with grooves 12 to receive the usual piston rings and having a cylindrical surface 14 over which is telescoped the upper portion of sheet metal skirt 16. 18 indicates bosses integral with the head designed to receive the usual piston pin. Attention is called particularly to the strengthening ribs 20 which give added support to the bosses and at the same time reinforce the head. 22 indicates plates of the form shown in Figure 8 secured to the piston pin bosses in the casting process. To improve the anchorage the portions of the plates surrounding the apertures in the bosses are preferably provided with inturned tongues 24 as shown in Figures 2, 3 and 8, alternate tongues being bent in opposite directions. Plates 22 are likewise provided with pierced openings 23, the metal from the openings forming integral flanges 25 about them.

It will be noted that the upper portion of the skirt 16 is in telescopic engagement with the cylindrical surface 14 of the piston head. To permit the greater expansion of the head required by the characteristics of the material of which it is made, without distortion of the skirt, there are provided in the cylindrical portion 14 of the head on both sides of the axis of the wrist pin bosses a number of slots 26. The set of slots on each side of the axis of the wrist pin bosses is preferably arranged within an arc of approximately 108° whose ends are equidistant from the axis of the wrist pin bosses so as not to reduce the strength of connection of the bosses to the head. The slots 26 permit expansion of the head of the piston without distortion of the skirt since the metal can expand into the slots.

Figure 1:
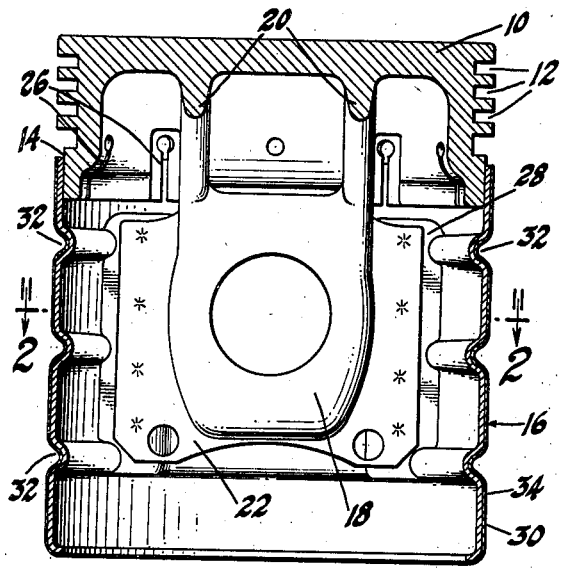

Referring to Figure 2 it will be noted that the skirt 16 is provided with inwardly pressed V-shaped ribs 28 adjacent the piston pin bosses. These ribs extend longitudinally of the piston, but, as best shown in Figures 1 and 3, stop short of the upper and lower edges of the skirt to provide in the first instance the telescopic portion surrounding the lower part 14 of the head of the piston and to provide the bearing portion 30 at the bottom of the skirt. The edges of the plates 22 overlap the sides of the ribs 28 and are preferably secured thereto by welding as best shown in Figures 1 and 2. This method of attachment is well adapted for production and has the additional advantage that the welds are not formed on a part of the bearing surface of the piston. Plates 22 also serve as reinforcements to hold the bearing portions of the piston wall against distortion.

The skirt may be formed to provide circumferential oil grooves as shown at 32.

It will be noted by reference to Figure 3 that the skirt is spaced from the ends of the piston pin bosses 18, although it is snugly fitted about the portion of the head directly above the bosses. Since this portion of the head is not provided with slots, it is necessary to relieve the skirt by grinding off a few thousandths to permit the necessary expansion of the metal.

The parts of the piston may, of course, be made of a variety of materials. However, it is preferable to employ for the heads some light material such as aluminum or magnesium alloys and to employ for the skirt sheet metal of sufficient softness to be easy to shape. Inasmuch as such sheet metal does not have proper qualities to make a good bearing surface with cast iron it is desirable to coat it with soft metal as shown at 34 to provide a bearing surface. This metal may be applied by electroplating or other methods as described in my prior Reissue Patent No. 18,814. Any of the kinds of soft bearing metal referred to in that patent may be used.

The improved piston will be found to be light in weight, and will at the same time maintain a good fit in the cylinder. The bearing qualities of the soft metal coating on the skirt will insure long service and prevent seizing and scoring particularly when used in combination with the slotted portion 14 of the head which prevents distortion of the skirt. The means of attachment of the head to the skirt is simple and readily accessible for the welding operation.

I claim:

1. A piston comprising a cast head having integral piston pin bosses, plates inseparably interlocked with the metal of the bosses and extending at right angles to the axis of the piston pin bosses, a sheet metal skirt having its upper portion in telescoping engagement with the lower portion of the head, the portion of the head overlapped by the skirt between the bosses being slotted throughout its length to permit expansion of the head without distortion of the corresponding portions of the skirt, the skirt being provided with inwardly pressed trough-shaped longitudinal ribs whose longitudinal edges are joined to the skirt engaging the plates and welded thereto, said ribs and plates constituting a reenforced connection between the head and skirt, and a coating of soft bearing metal on the outer bearing surface of the skirt.

2. In a piston, a cup-shaped head which is made of a metal which has a relatively high temperature coefficient of expansion, ears which are integral with and project from the open end of the head in the direction of the longitudinal axis of the piston, a skirt which is made of a metal which has a relatively low temperature coefficient of expansion and surrounds the projecting ends of the ears and an approximately cylindrical portion of the outer side wall of the open end of the head and always fits snugly around the latter, means which interconnects the skirt and the head through the ears, and slots which extend lengthwise of the piston in the portion of the side wall of the head which is located between the ears and surrounded by the skirt.

3. In a piston, a generally cup-shaped head in which there are provided packing ring grooves, wrist pin bosses carried by the head, a skirt which is telescoped and fits snugly around a portion of the head which is of substantially uniform circumference throughout its length, and slots which extend lengthwise of the piston through the side wall of the head from its lower end to a point above the upper end of the skirt but below a packing ring groove to prevent expansion of the head between the wrist pin bosses distorting the skirt.

4. In a piston, a generally cup-shaped head in which there are provided packing ring grooves, wrist pin bosses carried by the head, a skirt of which a portion is telescoped and fits snugly around a portion of the head which is of substantially uniform circumference throughout its length, and slots which extend lengthwise of the piston through the side wall of the head from its lower end to a point above the upper end of the skirt but below a packing ring groove to prevent expansion of the head between the wrist pin bosses distorting the skirt, the portion of the skirt which is telescoped around the mentioned portion of the head being of smaller external diameter in the line of the wrist pin bosses than at a right angle thereto.

CALEB E. SUMMERS.